(12) United States Patent
Li

(10) Patent No.: US 11,943,765 B2
(45) Date of Patent: Mar. 26, 2024

(54) METHOD AND APPARATUS FOR DATA TRANSMISSION

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 370 days.

(21) Appl. No.: 17/416,370

(22) PCT Filed: Dec. 20, 2018

(86) PCT No.: PCT/CN2018/122363
§ 371 (c)(1),
(2) Date: Jun. 18, 2021

(87) PCT Pub. No.: WO2020/124487
PCT Pub. Date: Jun. 25, 2020

(65) Prior Publication Data
US 2022/0078821 A1 Mar. 10, 2022

(51) Int. Cl.
*H04W 28/02* (2009.01)
*H04L 5/00* (2006.01)
(Continued)

(52) U.S. Cl.
CPC ....... *H04W 72/1268* (2013.01); *H04L 5/0053* (2013.01); *H04W 28/0252* (2013.01);
(Continued)

(58) Field of Classification Search
CPC .................................................. H04L 5/0053
See application file for complete search history.

(56) References Cited

U.S. PATENT DOCUMENTS

2018/0092125 A1* 3/2018 Sun .................. H04W 74/02
2018/0199359 A1* 7/2018 Cao .................. H04L 1/1896
(Continued)

FOREIGN PATENT DOCUMENTS

CN    106507497 A    3/2017
CN    106793091 A    5/2017
(Continued)

OTHER PUBLICATIONS

International Search Report in the international application No. PCT/CN2018/122363, dated Sep. 19, 2019.
(Continued)

*Primary Examiner* — San Htun
(74) *Attorney, Agent, or Firm* — Syncoda LLC; Feng Ma

(57) ABSTRACT

A method and apparatus for data transmission. In the method, a target alert sequence is transmitted to a network access device by using a first uplink grant-free transmission resource corresponding to the target alert sequence. The target alert sequence is configured to notify the network access device that the terminal requests to use the first uplink grant-free transmission resource to transmit uplink data. The uplink data is transmitted by using a transmission resource different from the first uplink grant-free transmission resource, when receiving a collision indication fed back by the network access device in response to the target alert sequence.

16 Claims, 14 Drawing Sheets

(51) Int. Cl.
*H04W 72/1268* (2023.01)
*H04W 72/23* (2023.01)
*H04W 74/00* (2009.01)
*H04W 74/0833* (2024.01)

(52) U.S. Cl.
CPC ......... *H04W 72/23* (2023.01); *H04W 74/004* (2013.01); *H04W 74/0841* (2013.01)

(56) References Cited

U.S. PATENT DOCUMENTS

| | | | |
|---|---|---|---|
| 2018/0206246 A1* | 7/2018 | Zhang | H04L 1/1896 |
| 2018/0324852 A1* | 11/2018 | Van Phan | H04L 1/08 |
| 2019/0068335 A1* | 2/2019 | Li | H04W 72/0446 |

FOREIGN PATENT DOCUMENTS

| | | |
|---|---|---|
| CN | 108024360 A | 5/2018 |
| CN | 108347321 A | 7/2018 |
| CN | 108365925 A | 8/2018 |
| CN | 108633005 A | 10/2018 |
| CN | 108668367 A | 10/2018 |
| CN | 109964517 A | 7/2019 |
| WO | 2016206083 A1 | 12/2016 |
| WO | 2017174115 A1 | 10/2017 |
| WO | 2018019085 A1 | 2/2018 |
| WO | 2018122609 A2 | 7/2018 |

OTHER PUBLICATIONS

English translation of the Written Opinion of the International Search Authority in the international application No. PCT/CN2018/122363, dated Sep. 19, 2019.
Zte et al. "Basic Grant-free Transmission for URLLC:"3GPP TSG RAN WGI AH NR Meeting, RI-1700253, Jan. 20, 2017 (Jan. 20, 2017), entire document, Best Available Date: Jan. 16-20, 2017.
3GPP TSG RAN WG1 Meeting #95 R1-1813118, Spokane, USA, Nov. 12-16, 2018, Agenda item: 7.2.6.3, Source: Nokia, Nokia Shanghai Bell, Title: On Configured Grant enhancements for NR URLLC, Document for: Discussion and Decision.
Supplementary European Search Report in the European application No. 18943708.0, dated Jun. 1, 2022.
Notice of Allowance of the Chinese application No. 201880003300.1, dated Jun. 21, 2022.
Panasonic, "UL Grant Conflict Handling" 3GPP TSG-RAN WG1 Meeting 87 R1-1612290, Nov. 14-18, 2016, Reno, U.S.A.
First Office Action of the Chinese application No. 201880003300.1, dated Oct. 9, 2021.

* cited by examiner

METHOD AND APPARATUS FOR DATA TRANSMISSION

CROSS-REFERENCE TO RELATED APPLICATION

The present application is a national stage of International Application No. PCT/CN2018/122363 filed on Dec. 20, 2018, the disclosure of which is hereby incorporated by reference in its entirety.

TECHNICAL FIELD

The present disclosure relates to the communication technology, and more particularly, to a method and an apparatus for data transmission.

BACKGROUND

At present, the mobile communication technology is in an evolution stage of a new generation communication technology, and an important characteristic of the new generation communication technology is to support flexible configuration of multiple traffic types. Different traffic types have different requirements for the wireless communication technology. For example, the main requirements for enhanced Mobile Broad Band (eMBB) traffic type focus on large bandwidth and high speed, the main requirements for Ultra Reliable Low Latency Communication (URLLC) traffic type focus on higher reliability and low latency, and the main requirements of massive machine type of communication (mMTC) traffic type focus on the large number of connections. Therefore, for the new generation wireless communication system, transmission of multiple traffic types is to be supported through flexible and configurable designs.

In order to improve resource utilization, the 5G New radio (NR) communication technology supports flexible resource multiplexing of the URLLC traffic and the eMBB traffic resources, to realize the coexistence of URLLC traffic and eMBB traffic. Considering that the URLLC traffic has the characteristics of low delay, high reliability, and uncertain traffic characteristics, in order to reduce latency in accessing a network by a terminal, the 5G NR supports an uplink grant-free transmission mode. That is, when there is data to be transmitted for an uplink user, the user data is directly transmitted on a pre-configured resource in a predetermined transmission mode. However, if an eMBB user and a URLLC user, or multiple URLLC users, transmit data at the same time, interference is caused to each other, which greatly affects demodulation performance. For the URLLC traffic having high requirements on transmission reliability and high transmission latency, the service quality is seriously affected.

SUMMARY

An embodiment of the present disclosure provides a method and apparatus for data transmission. The technical solutions are described as follows.

According to a first aspect of embodiments of the present disclosure, there is provided a method for data transmission which is applied to a terminal, and the method includes:
transmitting a target alert sequence to a network access device by using a first uplink grant-free transmission resource corresponding to the target alert sequence, where the target alert sequence is configured to notify the network access device that the terminal requests to use the first uplink grant-free transmission resource to transmit uplink data; and
transmitting the uplink data by using a transmission resource different from the first uplink grant-free transmission resource, when receiving a collision indication fed back by the network access device in response to the target alert sequence.

According to the method for data transmission provided by the embodiment of the disclosure, the alert sequence is predefined, and before transmitting the uplink data, the terminal transmits the target alert sequence to the network access device by using the first uplink grant-free transmission resource corresponding to the target alert sequence, and the terminal transmits the uplink data by using the transmission resource different from the first uplink grant-free transmission resource, when the network access device determines that the first uplink grant-free transmission resource corresponding to the target alert sequence is occupied. Thereby, the collision problem during transmission through resource multiplexing of multiple users can be avoided, transmission interference can be reduced, demodulation performance can be improved, and service quality can be ensured.

In one embodiment, the method further includes:
receiving a notification message from the network access device; wherein the notification message comprises at least one candidate alert sequence determined by the network access device, and indication information of at least one uplink grant-free transmission resource allocated for the at least one candidate alert sequence.

In one embodiment, the method further includes:
transmitting the uplink data to the network access device by using the first uplink grant-free transmission resource corresponding to the target alert sequence, when there is no collision indication fed back by the network access device.

In one embodiment, the transmitting the uplink data by using the transmission resource different from the first uplink grant-free transmission resource includes:
selecting a target uplink grant-free transmission resource from uplink grant-free transmission resources pre-allocated for the terminal except the first uplink grant-free transmission resource corresponding to the target alert sequence; and
transmitting the uplink data to the network access device by using the target uplink grant-free transmission resource in an uplink grant-free transmission manner.

In one embodiment, the collision indication includes: indication information for instructing the terminal to transmit data in a grant-type transmission manner;
the transmitting the uplink data by using the transmission resource different from the first uplink grant-free transmission resource includes:
requesting the network access device to allocate an available transmission resource for the terminal in the grant-type transmission manner; and
transmitting the uplink data by using the available transmission resource.

In one embodiment, the number of the target alert sequences is 1 or 2.

In one embodiment, the uplink data includes: uplink enhanced mobile broadband (eMBB) traffic data, or uplink ultra reliable low latency communication (URLLC) traffic data.

According to a second aspect of embodiments of the present disclosure, there is provided a method for data transmission which is applied to a network access device, and the method includes:

receiving a target alert sequence from a terminal;

determining whether a first uplink grant-free transmission resource corresponding to the target alert sequence is occupied; and transmitting a collision indication to the terminal in response to that the first uplink grant-free transmission resource is occupied, where the collision indication is configured to notify the terminal that the first uplink grant-free transmission resource corresponding to the target alert sequence is occupied.

In one embodiment, the method further includes:

determining at least one candidate alert sequence, and allocating at least one uplink grant-free transmission resource for the at least one candidate alert sequence; and transmitting a notification message to the terminal; wherein the notification message comprises the at least one candidate alert sequence and indication information of the at least one uplink grant-free transmission resource allocated for the at least one candidate alert sequence.

In one embodiment, the collision indication comprises: indication information for instructing the terminal to transmit data in a grant-type transmission manner.

In one embodiment, the transmitting the collision indication to the terminal includes:

carrying the collision indication in a downlink control channel or a downlink traffic channel.

According to a third aspect of an embodiment of the present disclosure, there is provided an apparatus for data transmission, and the apparatus includes:

a first sending module, configured to transmit a target alert sequence to a network access device by using a first uplink grant-free transmission resource corresponding to the target alert sequence; wherein the target alert sequence is configured to notify the network access device that the terminal requests to use the first uplink grant-free transmission resource to transmit uplink data; and;

a second transmitting module, configured to transmit the uplink data by using a transmission resource different from the first uplink grant-free transmission resource, when receiving a collision indication fed back by the network access device in response to the target alert sequence.

In one embodiment, the apparatus further includes:

a first receiving module, configured to receive a notification message from the network access device; wherein the notification message comprises at least one candidate alert sequence determined by the network access device, and indication information of at least one uplink grant-free transmission resource allocated for the at least one candidate alert sequence.

In one embodiment, the apparatus further includes:

a third transmitting module, configured to transmit the uplink data to the network access device by using the first uplink grant-free transmission resource corresponding to the target alert sequence, when there is no collision indication fed back by the network access device.

In one embodiment, the second transmitting module includes:

a selection submodule, configured to select a target uplink grant-free transmission resource from uplink grant-free transmission resources pre-allocated for the terminal except the first uplink grant-free transmission resource corresponding to the target alert sequence; and a first transmitting submodule, configured to transmit the uplink data to the network access device by using the target uplink grant-free transmission resource in an uplink grant-free transmission manner.

In one embodiment, the collision indication includes indication information for instructing the terminal to transmit data in a grant-type transmission manner;

the second transmitting module includes:

a resource request submodule, configured to request the network access device to allocate an available transmission resource for the terminal in the grant-type transmission manner; and a second transmitting submodule, configured to transmit the uplink data by using the available transmission resource.

According to a fourth aspect of an embodiment of the present disclosure, there is provided an apparatus for data transmission, and the apparatus includes:

a second receiving module, configured to receive a target alert sequence from a terminal;

a judgement module, configured to determine whether a first uplink grant-free transmission resource corresponding to the target alert sequence is occupied; and a fourth transmitting module, configured to transmit a collision indication to the terminal in response to that the first uplink grant-free transmission resource is occupied; wherein the collision indication is configured to notify the terminal that the first uplink grant-free transmission resource corresponding to the target alert sequence is occupied.

In one embodiment, the apparatus further includes:

a determination module, configured to determine at least one candidate alert sequence and allocating at least one uplink grant-free transmission resource for the at least one candidate alert sequence; and a fifth transmitting module, configured to transmit a notification message to the terminal; wherein the notification message comprises the at least one candidate alert sequence and indication information of the at least one uplink grant-free transmission resource allocated for the at least one candidate alert sequence.

In one embodiment, the fourth transmitting module carries the collision indication in a downlink control channel or a downlink traffic channel.

According to a fifth aspect of an embodiment of the present disclosure, there is provided an apparatus for data transmission, and the apparatus includes:

a processor;

a memory for storing a computer program executable by the processor;

herein, the processor is configured to:

transmit a target alert sequence to a network access device by using a first uplink grant-free transmission resource corresponding to the target alert sequence;

wherein the target alert sequence is configured to notify the network access device that the terminal requests to use the first uplink grant-free transmission resource to transmit uplink data; and transmit the uplink data by using a transmission resource different from the first uplink grant-free transmission resource, when receiving a collision indication fed back by the network access device in response to the target alert sequence.

According to a sixth aspect of an embodiment of the present disclosure, there is provided an apparatus for data transmission, and the apparatus includes:

a processor;

a memory for storing a computer program executable by the processor;

herein, the processor is configured to:

receive a target alert sequence from a terminal;

determine whether a first uplink grant-free transmission resource corresponding to the target alert sequence is occupied; and transmit a collision indication to the terminal in response to that the first uplink grant-free transmission resource is occupied; wherein the collision indication is configured to notify the terminal that the first uplink grant-free transmission resource corresponding to the target alert sequence is occupied.

According to a seventh aspect of an embodiment of the present disclosure, there is provided a computer-readable storage medium having stored thereon computer executable instructions that, when executed by a processor, cause operations of the method described in the first aspect to be performed.

According to an eighth aspect of an embodiment of the present disclosure, there is provided a computer-readable storage medium having stored thereon computer executable instructions that, when executed by a processor, cause operations of the method described in the second aspect to be performed.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same reference numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

An embodiment of the present disclosure provides a method for data transmission, which is applied to a terminal, and the method includes: transmitting a target alert sequence to a network access device by using a first uplink grant-free transmission resource corresponding to the target alert sequence; where the target alert sequence is configured to notify the network access device that the terminal requests to use the first uplink grant-free transmission resource to transmit uplink data; and transmitting the uplink data by using a transmission resource different from the first uplink grant-free transmission resource, when receiving a collision indication fed back by the network access device in response to the target alert sequence. According to the method for data transmission provided by the embodiment of the present disclosure, the alert sequence is transmitted to the network access device by using the first uplink grant-free transmission resource corresponding to the target alert sequence, and the terminal transmits the uplink data by using a transmission resource different from the first uplink grant-free transmission resource, when the network access device determines that the first uplink grant-free transmission resource corresponding to the target alert sequence is occupied. In this way, the collision problem during transmission through resource multiplexing of multiples users can be avoided, transmission interference can be reduced, demodulation performance can be improved, and service quality can be ensured.

It is to be noted that the method for data transmission provided in the embodiment of the present disclosure can be applied to a 3G/4G/5G-based communication network. The terminal according to the present disclosure may include, for example, an electronic device such as a smartphone, a notebook, an in-vehicle device, or an intelligent wearable device. The network access device may include, for example, a communication device, such as a base station or a relay station, which provides a wireless access service for the terminal.

Based on the above analysis, the following specific embodiments are presented.

Figure 1:
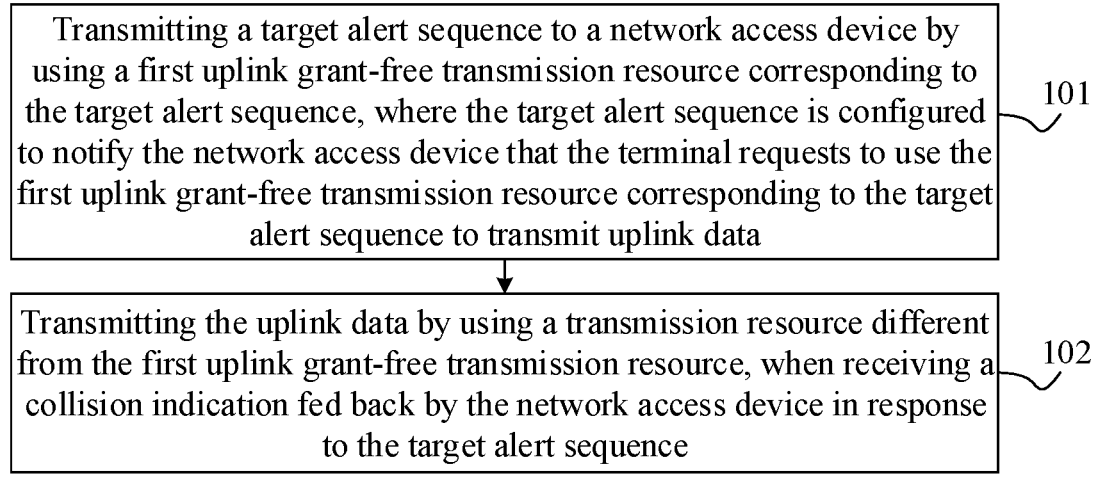
FIG. 1 is a flow chart showing a method for data transmission according to an exemplary embodiment.

FIG. 1 is a flow chart showing a method for data transmission, which may be executed by a terminal, according to an exemplary embodiment. Referring to FIG. 1, the method for data transmission includes steps S101 and S102.

In step S101, the terminal transmits a target alert sequence to a network access device by using a first uplink grant-free transmission resource corresponding to the target alert sequence, where the target alert sequence is configured to notify the network access device that the terminal requests to use the first uplink grant-free transmission resource corresponding to the target alert sequence to transmit uplink data.

For example, before the step S101, the method provided in this embodiment further includes selecting the target alert sequence from pre-acquired at least one candidate alert sequence. The uplink data may include uplink enhanced mobile broadband (eMBB) traffic data or uplink ultra reliable low latency communication (URLLC) traffic data, both of which allow uplink grant-free transmission.

For example, the number of the target alert sequence may be 1. In order to obtain more transmission opportunities for the terminal, the terminal may transmit multiple different alert sequences. The number of the alert sequences that the terminal can transmit is determined by the network access device and notified to the terminal through a broadcast message. Alternatively, the terminal may transmit two alert sequences.

For example, the network access device predetermines at least one candidate alert sequence, and allocates at least one uplink grant-free transmission resource for the at least one candidate alert sequence. The at least one candidate alert sequence may be a group of sequences predefined by the network access device, and the candidate alert sequences correspond to predefined uplink grant-free transmission resources one-to-one or many-to-many. Furthermore, different candidate alert sequences may be orthogonal to each other to avoid interference.

The terminal may obtain the at least one candidate alert sequence in advance by transmitting a notification message to the terminal after the network access device determines the at least one candidate alert sequence. The notification message includes at least one candidate alert sequence and indication information of the uplink grant-free transmission resource, allocated for the at least one candidate alert sequence. The network access device may carry the notification message in the broadcast message, or the network access device may carry the notification message in an uplink grant-free transmission resource configuration message transmitted by the terminal. The terminal receives the notification message from the network access device, and learns the at least one candidate alert sequence and the indication information of the uplink grant-free transmission resource allocated for the at least one candidate alert sequence. Therefore, by carrying the at least one candidate alert sequence and the indication information of uplink grant-free transmission resource allocated for the at least one candidate alert sequence in the notification message issued by the network access device, implementation of the solution can be simplified.

In step S102, the terminal transmits the uplink data by using a transmission resource different from the first uplink grant-free transmission resource, when receiving a collision indication fed back by the network access device in response to the target alert sequence.

According to the technical solution provided by the embodiment of the disclosure, the alert sequence is predefined, and before transmitting the uplink data, the terminal transmits the target alert sequence to the network access device by using the first uplink grant-free transmission resource corresponding to the target alert sequence, and the terminal transmits the uplink data by using the transmission resource different from the first uplink grant-free transmission resource, when the network access device determines that the first uplink grant-free transmission resource corresponding to the target alert sequence is occupied. In this way, the collision problem during transmission through resource multiplexing of multiples users can be avoided, transmission interference can be reduced, demodulation performance can be improved, and service quality can be ensured.

For example, before transmitting the uplink data, the terminal transmits the target alert sequence to the network access device by using the first uplink grant-free transmission resource corresponding to the target alert sequence, so as to notify the network access device that the terminal requests to use the first uplink grant-free transmission resource corresponding to the target alert sequence to transmit the uplink data.

When receiving the target alert sequence from the terminal, the network access device determines whether the first uplink grant-free transmission resource corresponding to the target alert sequence is currently occupied by other users or other services.

When the first uplink grant-free transmission resource corresponding to the target alert sequence is not occupied currently, the network access device does not make any response to the terminal. And the terminal transmits the uplink data to the network access device by using the first uplink grant-free transmission resource corresponding to the target alert sequence, when there is no collision indication fed back by the network access device.

The network access device transmits a collision indication to the terminal, in response to that the first uplink grant-free transmission resource corresponding to the target alert sequence is occupied. Herein, the collision indication is configured to notify the terminal that the first uplink grant-free transmission resource corresponding to the target alert sequence is occupied. After receiving the collision indication, the terminal selects a target uplink grant-free transmission resource, for which a collision indication is not received, from the uplink grant-free transmission resources pre-allocated for the terminal except the first uplink grant-free transmission resource corresponding to the target alert sequence. The terminal transmits the uplink data to the network access device by using the target uplink grant-free transmission resource in an uplink grant-free transmission manner.

For example, in response to that the first uplink grant-free transmission resource corresponding to the target alert sequence is occupied, the collision indication transmitted by the network access device to the terminal may also include indication information for instructing the terminal to transmit data in a grant-type transmission manner. After receiving the collision indication, the terminal requests the network access device to allocate an available transmission resource for the terminal in the grant-type transmission manner, and then transmits the uplink data by using the allocated available transmission resource.

In response to that the first uplink grant-free transmission resource corresponding to the target alert sequence is occupied, the implementation manner in which the collision indication transmitted by the network access device to the terminal includes the indication information for instructing the terminal to transmit data in the grant-type transmission manner, may include any one of the following manners.

Manner a): when the first uplink grant-free transmission resource is occupied by other users, and the uplink grant-free transmission resources pre-allocated for the terminal except the first uplink grant-free transmission resource corresponding to the target alert sequence are occupied by other users, the network access device transmits a collision indication to the terminal, and the collision indication includes indication information for instructing the terminal to transmit data in the grant-type transmission manner. The collision indication is configured to notify the terminal that the first uplink grant-free transmission resource corresponding to the target alert sequence is occupied; and the collision indication instructs the terminal to transmit data in the grant-type transmission manner. After receiving the collision indication, the terminal requests the network access device to allocate the available transmission resource for the terminal in the grant-type transmission manner, and then transmits the uplink data by using the allocated available transmission resource.

Manner b): when the first uplink grant-free transmission resource is occupied by other users, and there are transmission resources that are not occupied by other users from the uplink grant-free transmission resources pre-allocated for the terminal except the first uplink grant-free transmission resource corresponding to the target alert sequence, the network access device transmits the collision indication to the terminal, and the collision indication includes indication information for instructing the terminal to transmit data in the grant-type transmission manner. The collision indication is configured to notify the terminal that the first uplink grant-free transmission resource corresponding to the target alert sequence is occupied; and the collision indication instructs the terminal to transmit data in the grant-type transmission manner. After receiving the collision indication, the terminal requests the network access device to allocate the available transmission resource for the terminal in the grant-type transmission manner, and then transmits the uplink data by using the allocated available transmission resource.

Manner c): when the first uplink grant-free transmission resource corresponding to the target alert sequence is occupied by other users, and there are transmission resources that are not occupied by other users from the uplink grant-free transmission resources pre-allocated for the terminal except the first uplink grant-free transmission resource corresponding to the target alert sequence, the network access device transmits the collision indication to the terminal to notify the terminal that the first uplink grant-free transmission resource corresponding to the target alert sequence is occupied. After receiving the collision indication, the terminal selects the target uplink grant-free transmission resource from uplink grant-free transmission resources pre-allocated for the terminal except the first uplink grant-free transmission resource corresponding to the target alert sequence; and the terminal transmits the uplink data to the network access device by using the target uplink grant-free transmission resource in the uplink grant-free transmission manner.

For example, the network access device may carry the collision indication in a downlink control channel or a downlink traffic channel. Alternatively, when learning that the first uplink grant-free transmission resource corresponding to the target alert sequence is occupied, the network access device may select a closest resource position that can be used for data transmission. The closest resource position that can be used for transmission refers to a resource position of the channel that can carry the collision indication currently.

For example, the terminal may determine the transmission resource and a transmission manner for the uplink data by setting an arrival time threshold of the collision indication, which can be exemplified as follows.

a): If the terminal receives the collision indication fed back by the network access device in response to the target alert sequence at a time instant earlier than N−K before the terminal transmits the uplink data, the terminal transmits the uplink data by using the transmission resource different from the first uplink grant-free transmission resource. Where N is a time instant when the terminal transmits the uplink data and the value of K may be predetermined by the network access device and signaled to the terminal.

Further, if the terminal receives the collision indication fed back by the network access device in response to the target alert sequence at a time instant earlier than N−K before the terminal transmits the uplink data, the terminal determines whether to receive the indication information for instructing the terminal to transmit data in the grant-type transmission manner. When there is no indication information for instructing the terminal to transmit data in the grant-type transmission manner, the terminal selects the target uplink grant-free transmission resource from uplink grant-free transmission resources pre-allocated for the terminal except the first uplink grant-free transmission resource corresponding to the target alert sequence. The terminal transmits the uplink data to the network access device by using the target uplink grant-free transmission resource in the uplink grant-free transmission manner. When receiving the indication information for instructing the terminal to transmit data by using the grant-type transmission manner, the terminal requests the network access device to allocate the available transmission resource for the terminal in the grant-type transmission manner; and then the terminal transmits the uplink data by using the available transmission resource.

b): if the terminal does not receive the collision indication fed back by the network access device in response to the target alert sequence at a time instant earlier than N−K before the terminal transmits the uplink data, the terminal determines that the first uplink grant-free transmission resource corresponding to the target alert sequence is not occupied by other users, so that the terminal can transmit the uplink data by directly using the first uplink grant-free transmission resource corresponding to the target alert sequence, and there is no collision problem during transmission through resource multiplexing.

According to the technical solution provided by the embodiment of the disclosure, the alert sequence is pre-defined, and before transmitting the uplink data, the terminal firstly transmits the target alert sequence to the network access device by using the first uplink grant-free transmission resource corresponding to the target alert sequence, and the terminal transmits the uplink data by using the transmission resource different from the first uplink grant-free transmission resource, when the network access device determines that the first uplink grant-free transmission resource corresponding to the target alert sequence is occupied by other users. Thereby, the collision problem during transmission through resource multiplexing of multiples users can be avoided, transmission interference can be reduced, demodulation performance can be improved, and service quality can be ensured.

In one embodiment, step S102 includes step C1 and step C2:

In step C1, the terminal selects a target uplink grant-free transmission resource from uplink grant-free transmission resources pre-allocated for the terminal except the first uplink grant-free transmission resource corresponding to the target alert sequence.

In step C2, the terminal transmits the uplink data to the network access device by using the target uplink grant-free transmission resource in an uplink grant-free transmission manner.

According to the technical solution provided by the embodiment of the disclosure, when receiving the collision indication fed back by the network access device in response to the target alert sequence, the terminal learns that the first uplink grant-free transmission resource corresponding to the target alert sequence is occupied, and then the terminal transmits the uplink data by using the uplink grant-free transmission resources pre-allocated for the terminal except the first uplink grant-free transmission resource corresponding to the target alert sequence, so as to reduce the network access delay of the terminal.

In one embodiment, the collision indication includes indication information for instructing the terminal to transmit data in a grant-type transmission manner. Step 102 includes step D1 and step D2.

In step D1, the terminal requests the network access device to allocate an available transmission resource for the terminal in the grant-type transmission manner.

In step D2, the terminal transmits the uplink data by using the available transmission resource.

According to the technical solution provided in the embodiment of the present disclosure, when receiving indication information from the network access device for instructing the terminal to transmit data in the grant-type transmission manner, the terminal can directly transmit data in the grant-type transmission manner. In this way, the collision problem during transmission through resource multiplexing of multiples users can be avoided and the transmission interference can be reduced.

In one embodiment, the number of the target alert sequence(s) is 1 or 2. Two target alert sequences can used to increase the transmission opportunities of the terminal.

Figure 2:
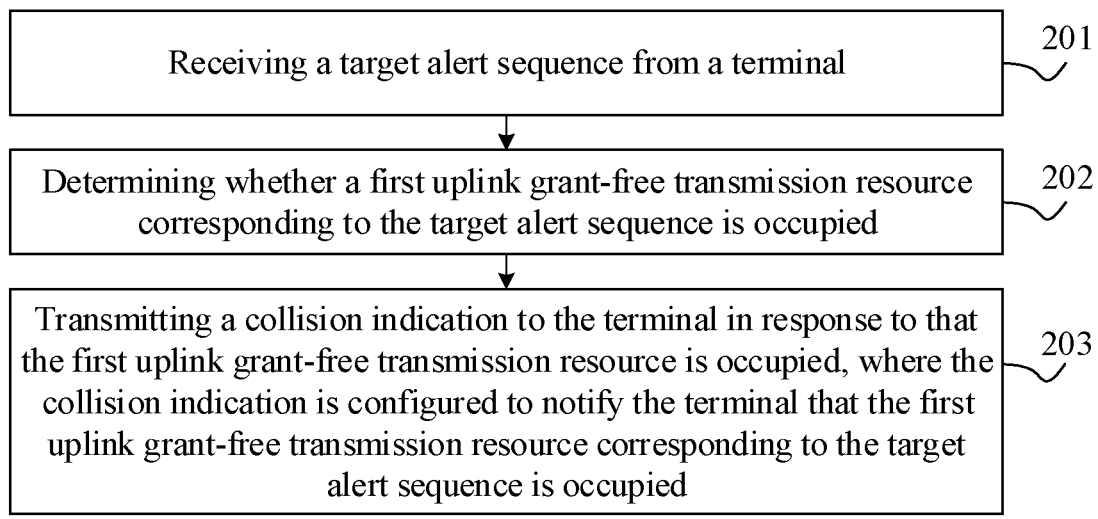
FIG. 2 is a flow chart showing a method for data transmission according to an exemplary embodiment.

FIG. 2 is a flow chart showing a method for data transmission, which may be executed by a network access device, according to an exemplary embodiment. Parts of the embodiment not described in detail may be referred to the embodiment of FIG. 1. Referring to FIG. 2, the method includes steps S201-S203.

In step S201, the network access device receives a target alert sequence from a terminal.

In step S202, the network access device determines whether a first uplink grant-free transmission resource corresponding to the target alert sequence is occupied.

In step S203, the network access device transmits a collision indication to the terminal in response to that the first uplink grant-free transmission resource is occupied. Herein, the collision indication is configured to notify the terminal that the first uplink grant-free transmission resource corresponding to the target alert sequence is occupied.

For example, when receiving the target alert sequence from the terminal, the network access device determines whether the first uplink grant-free transmission resource corresponding to the target alert sequence is currently occupied by other users or other services. When the first uplink grant-free transmission resource corresponding to the target alert sequence is not occupied currently, the network access device does not make a response to the terminal. And when there is no collision indication fed back by the network access device, the terminal transmits the uplink data to the network access device by using the first uplink grant-free transmission resource corresponding to the target alert sequence. When the first uplink grant-free transmission resource corresponding to the target alert sequence is occupied, the network access device transmits the collision indication to the terminal to notify the terminal that the first uplink grant-free transmission resource corresponding to the target alert sequence is occupied. After receiving the collision indication, the terminal selects the target uplink grant-free transmission resource from uplink grant-free transmission resources pre-allocated for the terminal except the first uplink grant-free transmission resource corresponding to the target alert sequence. The terminal transmits the uplink data to the network access device by using the target uplink grant-free transmission resource in an uplink grant-free transmission manner.

According to the technical solution provided by the embodiment of the disclosure, the alert sequence is pre-defined, and before transmitting the uplink data, the terminal transmits the alert sequence to the network access device. When determining that the first uplink grant-free transmission resource corresponding to the alert sequence is occupied, the network access device notifies the terminal that the first uplink grant-free transmission resource corresponding to the target alert sequence is occupied, so that the terminal can transmit the uplink data by using the transmission resource different from the first uplink grant-free transmission resource. In this way, the collision problem during transmission through resource multiplexing of multiples users can be avoided, transmission interference can be reduced, demodulation performance can be improved, and service quality can be ensured.

In one embodiment, the method further includes determining at least one candidate alert sequence, allocating at least one uplink grant-free transmission resource for the at least one candidate alert sequence, and transmitting a notification message to the terminal. Herein, the notification message includes the at least one candidate alert sequence and indication information of the at least one uplink grant-free transmission resource allocated for the at least one candidate alert sequence.

In one embodiment, the collision indication includes indication information for instructing the terminal to transmit data in a grant-type transmission manner.

In one embodiment, the step of transmitting the collision indication to the terminal includes carrying the collision indication in a downlink control channel or a downlink traffic channel.

Figure 3:
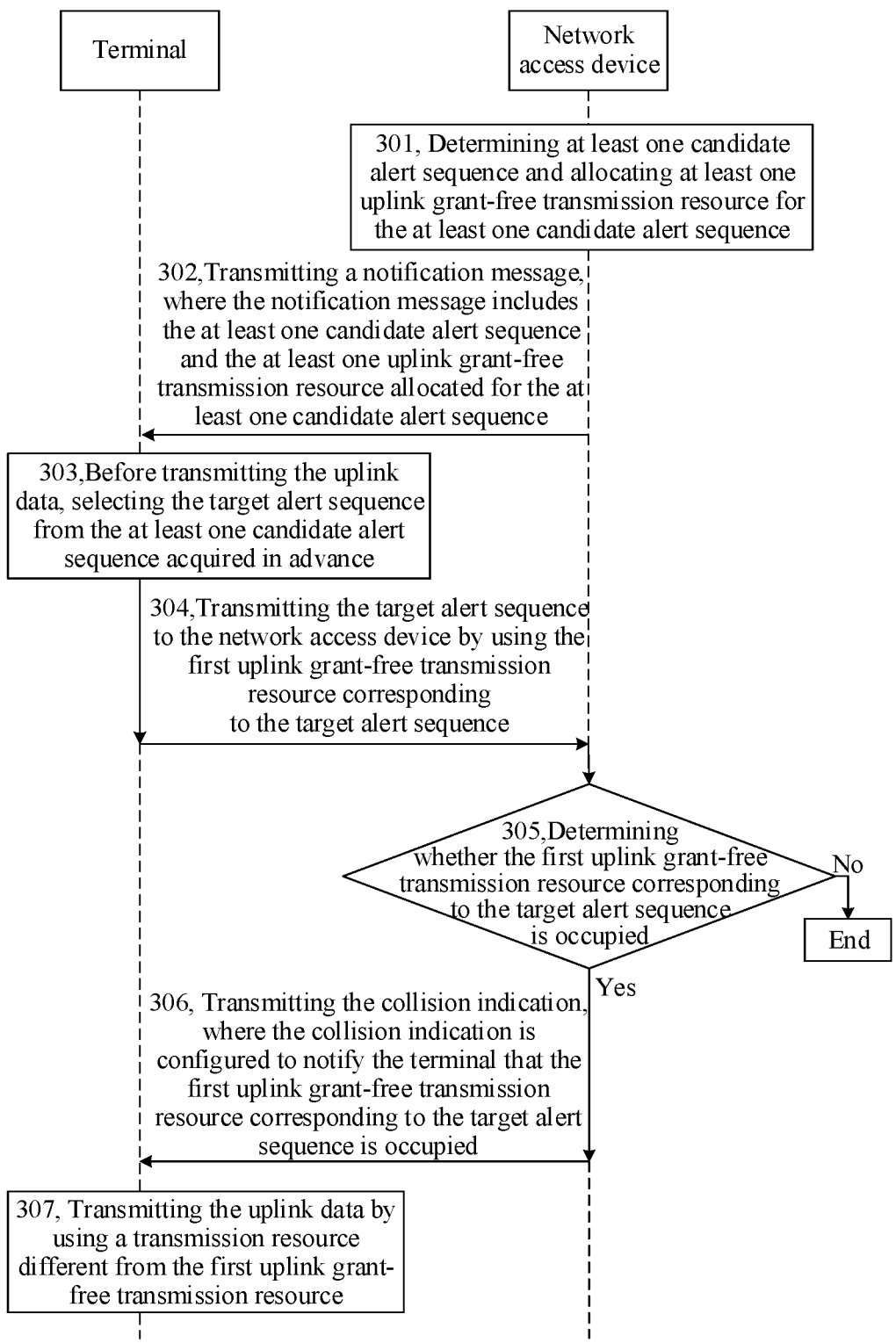
FIG. 3 is a flow chart showing a method for data transmission according to an exemplary embodiment.

FIG. 3 is a flow chart showing a method for data transmission, which is implemented by a terminal in cooperation with a network access device, according to an exemplary embodiment. As shown in FIG. 3, based on the embodiments shown in FIGS. 1 and 2, the method for data transmission according to the present disclosure may include steps S301-S307.

In step S301, the network access device determines at least one candidate alert sequence and allocates at least one uplink grant-free transmission resource for the at least one candidate alert sequence.

In step S302, the network access device transmits a notification message to the terminal, where the notification message includes the at least one candidate alert sequence and the at least one uplink grant-free transmission resource allocated for the at least one candidate alert sequence. The terminal receives the notification message from the network access device, and acquires the at least one candidate alert sequence and indication information of the at least one uplink grant-free transmission resource allocated for the at least one candidate alert sequence.

In step S303, before transmitting the uplink data, the terminal selects the target alert sequence from the pre-acquired at least one candidate alert sequence.

In step S304, the terminal transmits the target alert sequence to the network access device by using the first uplink grant-free transmission resource corresponding to the target alert sequence. Herein, the target alert sequence is configured to notify the network access device that the terminal requests to use the first uplink grant-free transmission resource to transmit the uplink data.

In step S305, when receiving the target alert sequence from the terminal, the network access device determines whether the first uplink grant-free transmission resource corresponding to the target alert sequence is occupied. When the first uplink grant-free transmission resource is occupied, the method proceeds to step 306. When the first uplink grant-free transmission resource is not occupied, the network access device does not feedback the collision indication to the terminal, and the flow in network access device side ends. When there is no collision indication fed back by the network access device, the terminal transmits the uplink data to the network access device by using the first uplink grant-free transmission resource corresponding to the target alert sequence.

In step S306, the network access device transmits the collision indication to the terminal, where the collision indication is configured to notify the terminal that the first uplink grant-free transmission resource corresponding to the target alert sequence is occupied.

In step S307, the terminal transmits the uplink data by using a transmission resource different from the first uplink grant-free transmission resource, when receiving the collision indication fed back by the network access device in response to the target alert sequence.

For example, the terminal selects a target uplink grant-free transmission resource from uplink grant-free transmission resources pre-allocated for the terminal except the first uplink grant-free transmission resource corresponding to the target alert sequence. The terminal transmits the uplink data to the network access device by using the target uplink grant-free transmission resource in an uplink grant-free transmission manner.

For example, the collision indication includes indication information for instructing the terminal to transmit data in a grant-type transmission manner. The terminal requests the network access device to allocate an available transmission resource for the terminal in the grant-type transmission manner. The terminal transmits the uplink data by using the available transmission resource.

According to the technical solution provided by the embodiment of the disclosure, the alert sequence is predefined, and before transmitting the uplink data, the terminal transmits the alert sequence to the network access device by using the first uplink grant-free transmission resource corresponding to the target alert sequence, and then the terminal transmits the uplink data by using the transmission resource different from the first uplink grant-free transmission resource, when the network access device determines that the first uplink grant-free transmission resource corresponding to the target alert sequence is occupied. In this way, the collision problem during transmission through resource multiplexing of multiples users can be avoided, transmission interference can be reduced, demodulation performance can be improved, and service quality can be ensured.

The following are embodiments for apparatuses of the present disclosure, which may be configured to implement the embodiments for the methods of the present disclosure. Parts of the embodiments for the apparatuses not described in detail may be referred to the embodiments for the methods.

Figure 4:
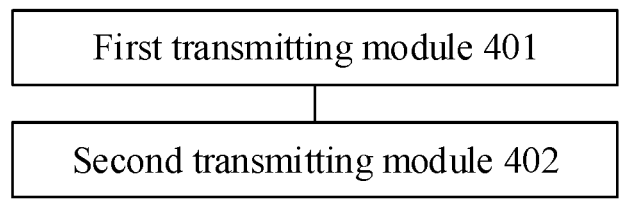
FIG. 4 is a block diagram illustrating an apparatus for data transmission according to an exemplary embodiment.

FIG. 4 is a block diagram of an apparatus for data transmission, which may be applied to a terminal, according to an exemplary embodiment. Referring to FIG. 4, the apparatus for data transmission includes a first transmitting module 401 and a second transmitting module 402.

Herein, the first transmitting module 401 is configured to transmit a target alert sequence to a network access device by using a first uplink grant-free transmission resource corresponding to the target alert sequence, where the target alert sequence is configured to notify the network access device that the terminal requests to use the first uplink grant-free transmission resource to transmit uplink data.

The second transmitting module 402 is configured to transmit the uplink data by using a transmission resource different from the first uplink grant-free transmission resource, when receiving a collision indication fed back by the network access device in response to the target alert sequence.

According to the apparatus provided by the embodiment of the present disclosure, the alert sequence is predefined, and before transmitting the uplink data, the terminal transmits the alert sequence to the network access device by using the first uplink grant-free transmission resource corresponding to the alert sequence, and then the terminal transmits the uplink data by using the transmission resource different from the first uplink grant-free transmission resource, when the network access device determines that the first uplink grant-free transmission resource corresponding to the target alert sequence is occupied. Thereby, the collision problem during transmission through resource multiplexing of multiples users can be avoided, transmission interference can be reduced, demodulation performance can be improved, and service quality can be ensured.

Figure 5:
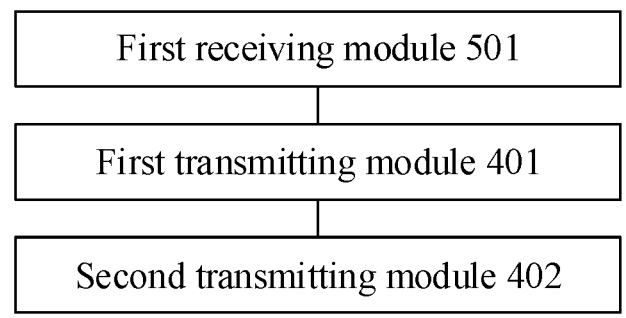
FIG. 5 is a block diagram illustrating an apparatus for data transmission according to an exemplary embodiment.

In one embodiment, referring to FIG. 5, the apparatus for data transmission shown in FIG. 4 may further include a first receiving module 501, which is configured to receive a notification message from the network access device. Herein, the notification message includes at least one candidate alert sequence determined by the network access device, and indication information of at least one uplink grant-free transmission resource allocated for the at least one candidate alert sequence.

Figure 6:
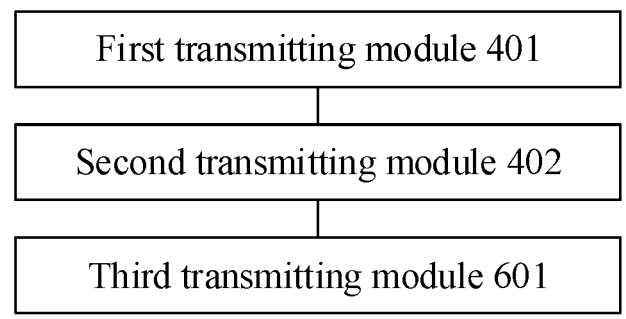
FIG. 6 is a block diagram illustrating an apparatus for data transmission according to an exemplary embodiment.

In one embodiment, referring to FIG. 6, the apparatus for data transmission shown in FIG. 4 may further include a third transmitting module 601, which is configured to transmit the uplink data to the network access device by using the first uplink grant-free transmission resource corresponding to the target alert sequence, when there is no collision indication fed back by the network access device.

Figure 7:
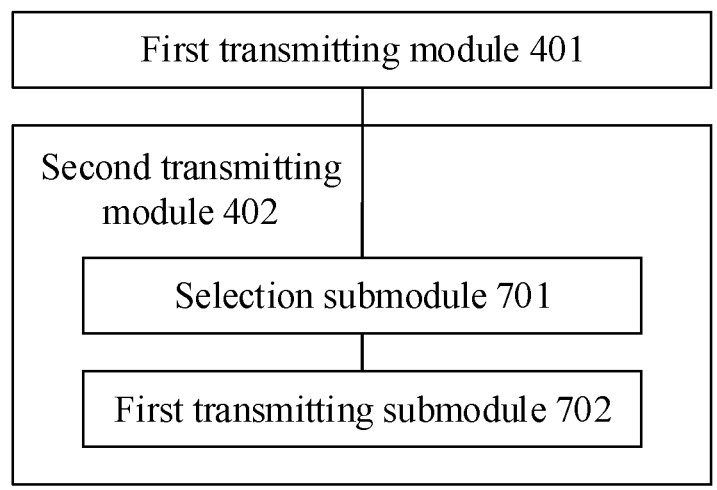
FIG. 7 is a block diagram illustrating an apparatus for data transmission according to an exemplary embodiment.

In one embodiment, referring to FIG. 7, the second transmitting module 402 from the apparatus for data transmission shown in FIG. 4 may be further configured to include a selection submodule 701 and a first transmitting submodule 702.

Herein, the selection submodule 701 is configured to select a target uplink grant-free transmission resource from uplink grant-free transmission resources pre-allocated for the terminal except the first uplink grant-free transmission resource corresponding to the target alert sequence.

The first transmitting submodule 702 is configured to transmit the uplink data to the network access device by using the target uplink grant-free transmission resource in an uplink grant-free transmission manner.

Figure 8:
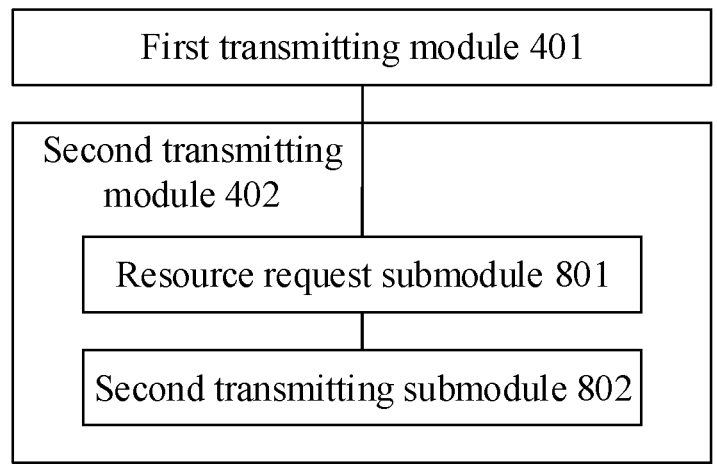
FIG. 8 is a block diagram illustrating an apparatus for data transmission according to an exemplary embodiment.

In one embodiment, the collision indication includes indication information for instructing the terminal to transmit data in a grant-type transmission manner. Referring to FIG. 8, the second transmitting module 402 from the apparatus for data transmission shown in FIG. 4 may be further configured to include a resource request submodule 801 and a second transmitting submodule 802.

Herein, the resource request submodule 801 is configured to request the network access device to allocate an available transmission resource for the terminal in the grant-type transmission manner.

The second transmitting submodule 802 is configured to transmit the uplink data by using the available transmission resource.

Figure 9:
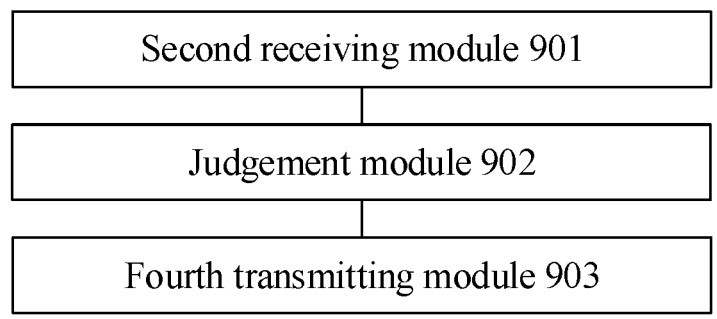
FIG. 9 is a block diagram illustrating an apparatus for data transmission according to an exemplary embodiment.

FIG. 9 is a block diagram of an apparatus for data transmission, which may be applied to a network access device, according to an exemplary embodiment. Referring to FIG. 9, the apparatus for data transmission includes a second receiving module 901, a judgement module 902, and a fourth transmitting module 903.

Herein, the second receiving module 901 is configured to receive a target alert sequence from a terminal.

The judgement module 902 is configured to determine whether a first uplink grant-free transmission resource corresponding to the target alert sequence is occupied.

The fourth transmitting module 903 is configured to transmit a collision indication to the terminal in response to that the first uplink grant-free transmission resource is occupied, where the collision indication is configured to notify the terminal that the first uplink grant-free transmission resource corresponding to the target alert sequence is occupied.

Figure 10:
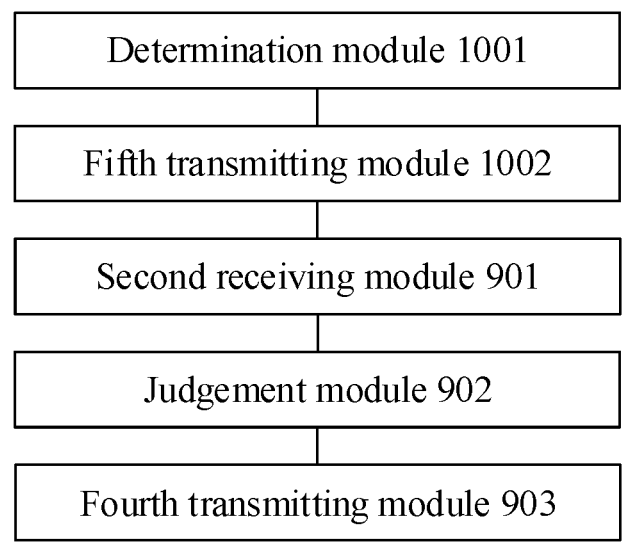
FIG. 10 is a block diagram illustrating an apparatus for data transmission according to an exemplary embodiment.

In one embodiment, referring to FIG. 10, the apparatus for data transmission shown in FIG. 9 may further include a determination module 1001 and a fifth transmitting module 1002.

Herein, the determination module 1001 is configured to determine at least one candidate alert sequence and allocate at least one uplink grant-free transmission resource for the at least one candidate alert sequence.

The fifth transmitting module 1002 is configured to transmit a notification message to the terminal, where the notification message includes the at least one candidate alert sequence and indication information of the at least one uplink grant-free transmission resource allocated for the at least one candidate alert sequence.

In one embodiment, the fourth transmitting module 902 carries the collision indication in a downlink control channel or a downlink traffic channel.

Figure 11:
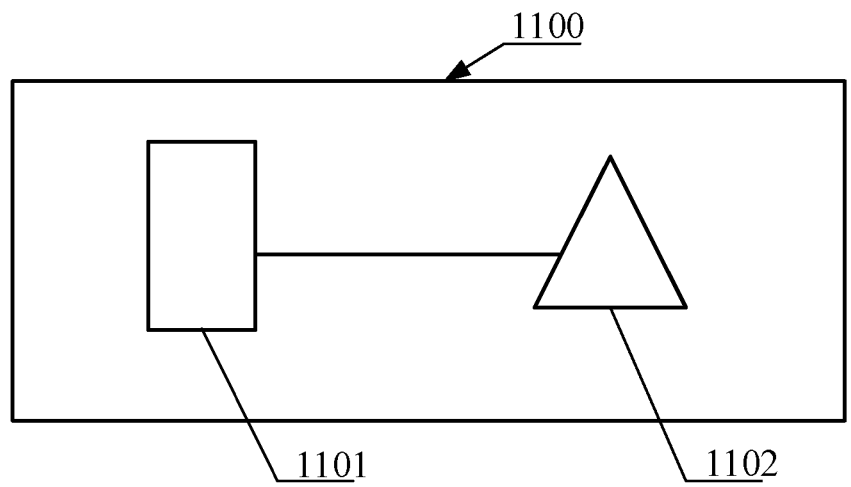
FIG. 11 is a block diagram illustrating an apparatus for data transmission according to an exemplary embodiment.

FIG. 11 is a block diagram of an apparatus 1100 for data transmission, which is applied to a terminal, according to an exemplary embodiment. The apparatus 1100 for data transmission includes:

a processor 1101;

a memory 1102 for storing a computer program executable by the processor 1101;

herein, the processor 1101 is configured to:

transmit a target alert sequence to a network access device by using a first uplink grant-free transmission resource corresponding to the target alert sequence; wherein the target alert sequence is configured to notify the network access device that the terminal requests to use the first uplink grant-free transmission resource to transmit uplink data; and transmit the uplink data by using a transmission resource different from the first uplink grant-free transmission resource, when receiving a collision indication fed back by the network access device in response to the target alert sequence.

In one embodiment, the processor 1101 may further be configured to:

receive a notification message from the network access device, where the notification message comprises at least one candidate alert sequence determined by the network access device, and indication information of at least one uplink grant-free transmission resource allocated for the at least one candidate alert sequence.

In one embodiment, the processor 1101 may further be configured to:

transmit the uplink data to the network access device by using the first uplink grant-free transmission resource corresponding to the target alert sequence, when there is no collision indication fed back by the network access device.

In one embodiment, the processor 1101 may further be configured to:

select a target uplink grant-free transmission resource from uplink grant-free transmission resources pre-allocated for the terminal except the first uplink grant-free transmission resource corresponding to the target alert sequence; and transmit the uplink data to the network access device by using the target uplink grant-free transmission resource in an uplink grant-free transmission manner.

In one embodiment, the collision indication includes indication information for instructing the terminal to transmit data in a grant-type transmission manner.

The processor 1101 may further be configured to:

request the network access device to allocate an available transmission resource for the terminal in the grant-type transmission manner; and transmit the uplink data by using the available transmission resource.

In one embodiment, the number of the target alert sequence is 1 or 2.

In one embodiment, the uplink data comprises: uplink enhanced mobile broadband (eMBB) traffic data, or uplink ultra reliable low latency communication (URLLC) traffic data.

Figure 12:
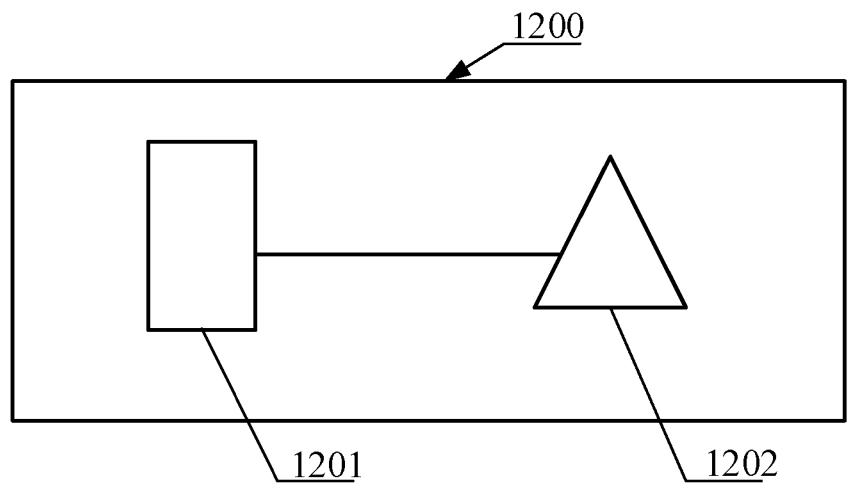
FIG. 12 is a block diagram illustrating an apparatus for data transmission according to an exemplary embodiment.

FIG. 12 is a block diagram of an apparatus 1200 for data transmission, which is applied to a network access device, according to an exemplary embodiment. The apparatus 1200 for data transmission includes:

a processor 1201;

a memory 1202 for storing a computer program executable by the processor 1201;

herein, the processor 1201 is configured to:

receive a target alert sequence from a terminal;

determine whether a first uplink grant-free transmission resource corresponding to the target alert sequence is occupied; and transmit a collision indication to the terminal in response to that the first uplink grant-free transmission resource is occupied, where the collision indication is configured to notify the terminal that the first uplink grant-free transmission resource corresponding to the target alert sequence is occupied.

In one embodiment, the processor 1201 may also be configured to:
  determine at least one candidate alert sequence and allocate at least one uplink grant-free transmission resource for the at least one candidate alert sequence; and
  transmit a notification message to the terminal, where the notification message comprises the at least one candidate alert sequence and indication information of the at least one uplink grant-free transmission resource allocated for the at least one candidate alert sequence.

In one embodiment, the collision indication includes indication information for instructing the terminal to transmit data in a grant-type transmission manner.

In one embodiment, the processor 1201 may further be configured to:
  carry the collision indication in a downlink control channel or a downlink traffic channel.

With respect to the apparatuses in the aforementioned embodiments, the specific manner in which the various modules perform operations has been described in detail in the related embodiments for the methods, and will not be described in detail herein.

Figure 13:
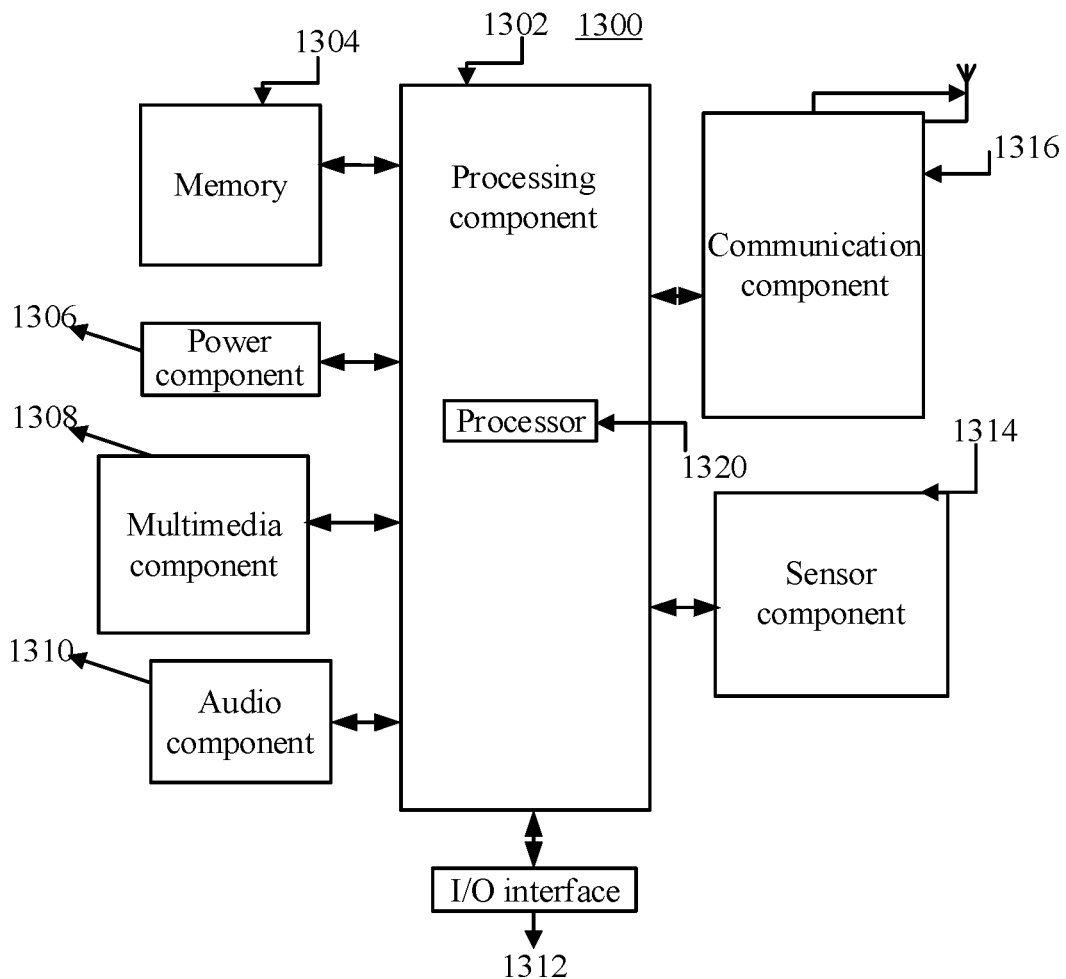
FIG. 13 is a block diagram illustrating an apparatus for data transmission according to an exemplary embodiment.

FIG. 13 is a block diagram of an apparatus for data transmission according to an exemplary embodiment. The apparatus 1300 for data transmission is applicable to a terminal. The apparatus 1300 for data transmission may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 generally controls the overall operation of the apparatus 1300 for data transmission, such as operations associated with displays, telephone calls, data communications, camera operations, and recording operations. The processing component 1302 may include one or more processors 1320 to execute instructions to perform all or a portion of the steps of the methods described above. In addition, the processing component 1302 may include one or more modules to facilitate interaction between the processing component 1302 and other components. For example, the processing component 1302 may include a multimedia module to facilitate interaction between the multimedia component 1308 and the processing component 1302.

The memory 1304 is configured to store various types of data to support the operation at the apparatus 1300 for data transmission. Examples of such data include instructions for any applications or methods operated on the apparatus 1300 for data transmission, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the apparatus 1300 for data transmission. The power component 1306 may include a power management system, one or more power sources, and any other components associated with the generation, management, and distribution of power in the apparatus 1300 for data transmission.

The multimedia component 1308 includes a screen providing an output interface between the apparatus 1300 for data transmission and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and the rear camera may receive an external multimedia datum while the apparatus 1300 for data transmission is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the apparatus 1300 for data transmission is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the apparatus 1300 for data transmission. For instance, the sensor component 1314 may detect an open/closed status of the apparatus 1300 for data transmission, relative positioning of components, e.g., the display and the keypad, of the apparatus 1300 for data transmission, a change in position of the apparatus 1300 for data transmission or a component of the apparatus 1300 for data transmission, a presence or absence of user contact with the apparatus 1300 for data transmission, an orientation or an acceleration/deceleration of the apparatus 1300 for data transmission, and a change in temperature of the apparatus 1300 for data transmission. The sensor component 1314 may include a proximity sensor configured to detect the presence of nearby objects without any physical contact. The sensor component 1314 may also include a light sensor, such as a complementary metal oxide semiconductor (CMOS) or charge coupled device (CCD) image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the apparatus 1300 for data transmission and other apparatuses. The apparatus 1300 for data transmission can access a wireless network based on a communication standard, such as WiFi, 2G, or 3G, or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1300 for data transmission may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1304, executable by the processor 1320 in the apparatus 1300 for data transmission, for performing the above-described methods. For example, the non-transitory computer-readable storage medium may be a ROM, a compact disc read only memory (CD-ROM), a magnetic tape, a floppy disc, an optical data storage device, and the like.

Figure 14:
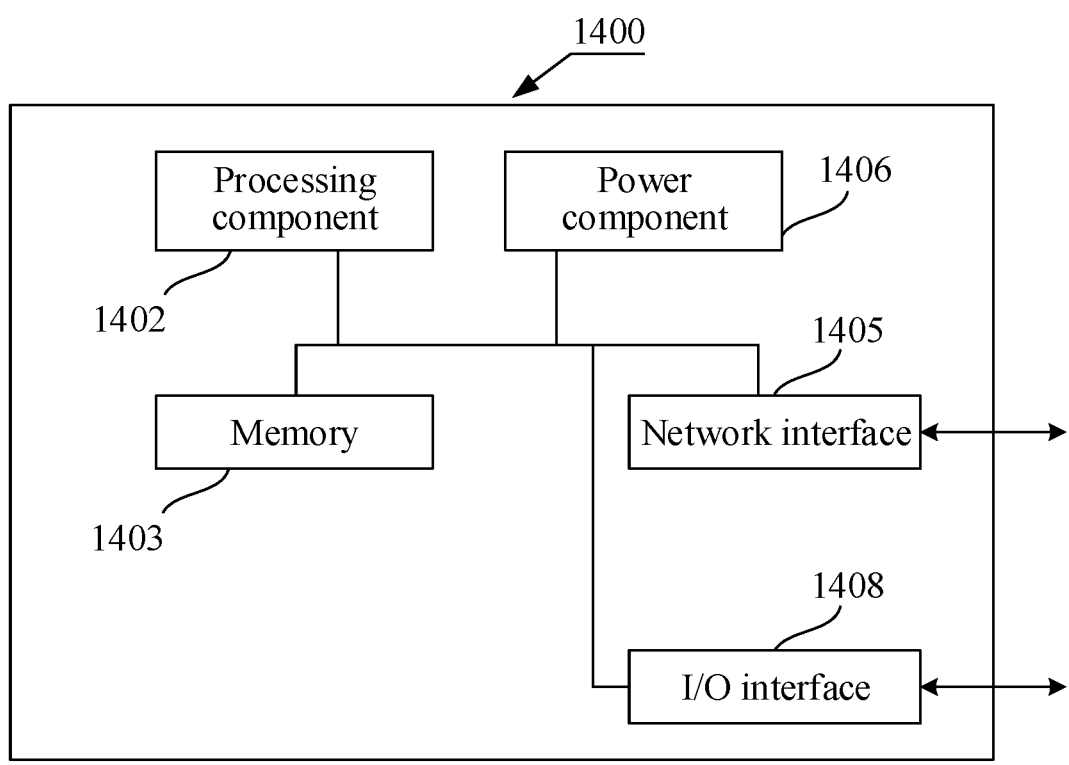
FIG. 14 is a block diagram illustrating an apparatus for data transmission according to an exemplary embodiment.

FIG. 14 is a block diagram illustrating an apparatus for data transmission according to an exemplary embodiment. For example, the apparatus 1400 for data transmission may be provided as a server. The apparatus 1400 for data transmission includes a processing component 1402 (that further includes one or more processors), and memory resources represented by a memory 1403 configured for storing instructions, such as applications, that may be executed by the processing component 1402. The application stored in the memory 1403 may include one or more modules, each corresponding to a set of instructions. In addition, the processing component 1402 is configured to execute instructions to perform the methods described above.

The apparatus 1400 for data transmission may also include a power component 1406 configured to perform power management of the apparatus 1400 for data transmission, a wired or wireless network interface 1405 configured to connect the apparatus 1400 for data transmission to a network, and an input/output (I/O) interface 1408. The apparatus 1400 for data transmission may operate based on an operating system stored in the memory 1403, such as Windows Server™, Mac OS X™, Unix™ Linux™, FreeBSD™, or the like.

A non-temporary computer-readable storage medium, for example, may be a ROM, a random access memory (RAM), a CD-ROM, a magnetic tape, a floppy disk, an optical data storage device, or the like. When the instructions in the storage medium are executed by the processor of the apparatus 1300 for data transmission or the apparatus 1400 for data transmission, which is enabled to perform a method including:

transmitting a target alert sequence to a network access device by using a first uplink grant-free transmission resource corresponding to the target alert sequence, where the target alert sequence is configured to notify the network access device that the terminal requests to use the first uplink grant-free transmission resource to transmit uplink data; and transmitting the uplink data by using a transmission resource different from the first uplink grant-free transmission resource, when receiving a collision indication fed back by the network access device in response to the target alert sequence.

In one embodiment, the method further includes:

receiving a notification message from the network access device, where the notification message comprises at least one candidate alert sequence determined by the network access device, and indication information of at least one uplink grant-free transmission resource allocated for the at least one candidate alert sequence.

In one embodiment, the method further includes:

transmitting the uplink data to the network access device by using the first uplink grant-free transmission resource corresponding to the target alert sequence, when there is no collision indication fed back by the network access device.

In one embodiment, the transmitting the uplink data by using the transmission resource different from the first uplink grant-free transmission resource includes:

selecting a target uplink grant-free transmission resource from uplink grant-free transmission resources pre-allocated for the terminal except the first uplink grant-free transmission resource corresponding to the target alert sequence; and transmitting the uplink data to the network access device by using the target uplink grant-free transmission resource in an uplink grant-free transmission manner.

In one embodiment, the collision indication includes indication information for instructing the terminal to transmit data in a grant-type transmission manner.

The uplink data by using the transmission resource different from the first uplink grant-free transmission resource, includes:

requesting the network access device to allocate an available transmission resource for the terminal in the grant-type transmission manner; and transmitting the uplink data by using the available transmission resource.

In one embodiment, the number of target alert sequences is 1 or 2.

In one embodiment, the uplink data comprises: uplink enhanced mobile broadband (eMBB) traffic data, or uplink ultra reliable low latency communication (URLLC) traffic data.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for data transmission, applied to a terminal, comprising:

receiving a notification message from a network access device; wherein the notification message comprises at least one candidate alert sequence determined by the network access device, and indication information of at least one uplink grant-free transmission resource allocated for the at least one candidate alert sequence;

wherein the at least one candidate alert sequence is a group of sequences predefined by the network access device, and receiving the notification message from the network access device comprises: receiving the notification message carried in a broadcast message transmitted by the network access device, or receiving the notification message carried in an uplink grant-free transmission resource configuration message transmitted by the network access device;

selecting a target alert sequence from the at least one candidate alert sequence;

before transmitting the uplink data by using a grant-free transmission resource, transmitting the target alert sequence to the network access device by using a first uplink grant-free transmission resource corresponding to the target alert sequence; wherein the target alert sequence is configured to notify the network access device that the terminal requests to use the first uplink grant-free transmission resource to transmit uplink data; and transmitting the uplink data by using a transmission resource different from the first uplink grant-free transmission resource, when receiving a collision indication fed back by the network access device in response to the target alert sequence.

2. The method of claim 1, further comprising:
transmitting the uplink data to the network access device by using the first uplink grant-free transmission resource corresponding to the target alert sequence, when there is no collision indication fed back by the network access device.

3. The method of claim 1, wherein transmitting the uplink data by using the transmission resource different from the first uplink grant-free transmission resource comprises:
selecting a target uplink grant-free transmission resource from uplink grant-free transmission resources pre-allocated for the terminal except the first uplink grant-free transmission resource corresponding to the target alert sequence; and
transmitting the uplink data to the network access device by using the target uplink grant-free transmission resource in an uplink grant-free transmission manner.

4. The method of claim 1, wherein the collision indication comprises: indication information for instructing the terminal to transmit data in a grant-type transmission manner; and
wherein transmitting the uplink data by using the transmission resource different from the first uplink grant-free transmission resource comprises:
requesting the network access device to allocate an available transmission resource for the terminal in the grant-type transmission manner; and
transmitting the uplink data by using the available transmission resource.

5. The method of claim 1, wherein the target alert sequence comprises one or two target alert sequences.

6. The method of claim 1, wherein the uplink data comprises: uplink enhanced mobile broadband (eMBB) traffic data, or uplink ultra reliable low latency communication (URLLC) traffic data.

7. A method for data transmission, applied to a network access device, comprising:
determining at least one candidate alert sequence and allocating at least one uplink grant-free transmission resource for the at least one candidate alert sequence, wherein the at least one candidate alert sequence is a group of sequences predefined by the network access device;

transmitting a notification message to a terminal to enable the terminal to select a target alert sequence from the at least one candidate alert sequence; wherein the notification message comprises the at least one candidate alert sequence and indication information of the at least one uplink grant-free transmission resource allocated for the at least one candidate alert sequence, and transmitting the notification message to a terminal comprises: carrying the notification message in a broadcast message, or carrying the notification message in an uplink grant-free transmission resource configuration message;

receiving the target alert sequence from the terminal;
determining whether a first uplink grant-free transmission resource corresponding to the target alert sequence is occupied;

transmitting a collision indication to the terminal in response to that the first uplink grant-free transmission resource is occupied; wherein the collision indication is configured to notify the terminal that the first uplink grant-free transmission resource corresponding to the target alert sequence is occupied; and receiving uplink data from the terminal by using a transmission resource different from the first uplink grant-free transmission resource.

8. The method of claim 7, wherein the collision indication comprises: indication information for instructing the terminal to transmit data in a grant-type transmission manner.

9. The method of claim 7, wherein transmitting the collision indication to the terminal, comprises:
carrying the collision indication in a downlink control channel or a downlink traffic channel.

10. A terminal, comprising:
a processor;
memory for storing a computer program executable by the processor;
wherein the processor is configured to:
receive a notification message from a network access device; wherein the notification message comprises at least one candidate alert sequence determined by the network access device, and indication information of at least one uplink grant-free transmission resource allocated for the at least one candidate alert sequence; wherein the at least one candidate alert sequence is a group of sequences predefined by the network access device, and in receiving the notification message from the network access device the processor is further configured to: receive the notification message carried in a broadcast message transmitted by the network access device, or receive the notification message carried in an uplink grant-free transmission resource configuration message transmitted by the network access device;

select a target alert sequence from the at least one candidate alert sequence before transmitting the uplink data by using a grant-free transmission resource, transmit the target alert sequence to the network access device by using a first uplink grant-free transmission resource corresponding to the target alert sequence; wherein the target alert sequence is configured to notify the network access device that the terminal requests to use the first uplink grant-free transmission resource to transmit uplink data; and transmit the uplink data by using a transmission resource different from the first uplink grant-free transmission resource, when receiving a collision indication fed back by the network access device in response to the target alert sequence.

11. The terminal of claim 10, wherein the processor is further configured to:
transmit the uplink data to the network access device by using the first uplink grant-free transmission resource corresponding to the target alert sequence, when there is no collision indication fed back by the network access device.

12. The terminal of claim 10, wherein in transmitting the uplink data by using the transmission resource different from the first uplink grant-free transmission resource, the processor is configured to:
select a target uplink grant-free transmission resource from uplink grant-free transmission resources pre-allocated for the terminal except the first uplink grant-free transmission resource corresponding to the target alert sequence; and
transmit the uplink data to the network access device by using the target uplink grant-free transmission resource in an uplink grant-free transmission manner.

13. The terminal of claim 10, wherein the collision indication comprises: indication information for instructing the terminal to transmit data in a grant-type transmission manner;
wherein in transmitting the uplink data by using the transmission resource different from the first uplink grant-free transmission resource, the processor is configured to:
request the network access device to allocate an available transmission resource for the terminal in the grant-type transmission manner; and
transmit the uplink data by using the available transmission resource.

14. A network access device, comprising:
a processor;
memory for storing a computer program executable by the processor;
wherein the processor is configured to:
determine at least one candidate alert sequence and allocating at least one uplink grant-free transmission resource for the at least one candidate alert sequence, wherein the at least one candidate alert sequence is a group of sequences predefined by the network access device;
transmit a notification message to a terminal to enable the terminal to select a target alert sequence from the at least one candidate alert sequence; wherein the notification message comprises the at least one candidate alert sequence and indication information of the at least one uplink grant-free transmission resource allocated for the at least one candidate alert sequence, and in transmitting the notification message to a terminal, the processor is further configured to: carry the notification message in a broadcast message, or carrying the notification message in an uplink grant-free transmission resource configuration message;
receive the target alert sequence from the terminal;
determine whether a first uplink grant-free transmission resource corresponding to the target alert sequence is occupied;
transmit a collision indication to the terminal in response to that the first uplink grant-free transmission resource is occupied, wherein the collision indication is configured to notify the terminal that the first uplink grant-free transmission resource corresponding to the target alert sequence is occupied; and
receive uplink data from the terminal by using a transmission resource different from the first uplink grant-free transmission resource.

15. The network access device of claim 14, wherein the fourth transmitting module carries the collision indication in a downlink control channel or a downlink traffic channel.

16. A non-transitory computer-readable storage medium, having stored thereon computer executable instructions that, when executed by a processor of a terminal, cause operations of the method of claim 1 to be performed.

* * * * *